106. COMPOSITIONS, COATING OR PLASTIC.

98

611,200

EXAMINER'S ROOM.

Portland Cement
Sand
White lead
Zinc chloride

UNITED STATES PATENT OFFICE.

JOSEPH HOBSON AND HARMON HOBSON, OF GOODSON, MISSOURI.

ARTIFICIAL-STONE COMPOSITION.

SPECIFICATION forming part of Letters Patent No. 611,200, dated September 20, 1898.

Application filed November 30, 1897. Serial No. 660,268. (No specimens.)

*To all whom it may concern:*

Be it known that we, JOSEPH HOBSON and HARMON HOBSON, citizens of the United States, residing at Goodson, in the county of Polk and State of Missouri, have invented a new and useful Artificial-Stone Composition, of which the following is a specification.

This invention relates to tombstones or monuments; and it has for its object to provide a new and useful artificial-stone composition for the body portion of the tombstone or monument.

The artificial-stone composition contemplated by the present invention is composed of Portland cement, sand, white lead, and chlorid of zinc, preferably mixed together in the proportion of Portland cement forty-eight per cent.; sand, forty-nine per cent.; white lead, two per cent., and chlorid of zinc, one per cent.

The sand that is used in the stone composition must be thoroughly cleaned and may be substituted by white granite; but ordinarily the sand is employed and is first mixed together with the cement while in a perfectly dry state. The chlorid of zinc and the white lead are mixed together in water, and the resulting mixture is then intimately combined with the mixed sand and cement, with enough additional water added to make a thin mortar, which is poured into the mold for shaping the tombstone or monument.

An important element of the artificial-stone composition is the white lead, which not only imparts to the tombstone or monument a clear white appearance, but also serves to toughen the composition and prevent the same from cracking, as well as providing for giving the tombstone or monument the appearance of being shaped from natural marble.

Having thus described the invention, what is claimed, and desired to be secured by Letters Patent, is—

An artificial-stone composition, composed of Portland cement, sand, white lead and chlorid of zinc, substantially as described.

In testimony that we claim the foregoing as our own we have hereto affixed our signatures in the presence of two witnesses.

JOSEPH HOBSON.
HARMON HOBSON.

Witnesses:
W. G. DRAKE,
T. O. BOGERT.

---

Utley, 336,675, Feb. 23, 1886, Class 106, Ornamental,
" 315,188, Apr. 7, 1885, " "
Budd, 178,904, June 20, 1876, Glass, Ornamentation.
Conroy et al., 290,744, Dec. 25, 1883, "
" " 290,745, " " "